Nov. 22, 1927.  1,650,308
J. WALLOS
PROCESS FOR MAKING CARAMELIZED FLOUR
Filed Oct. 22, 1924   2 Sheets-Sheet 1
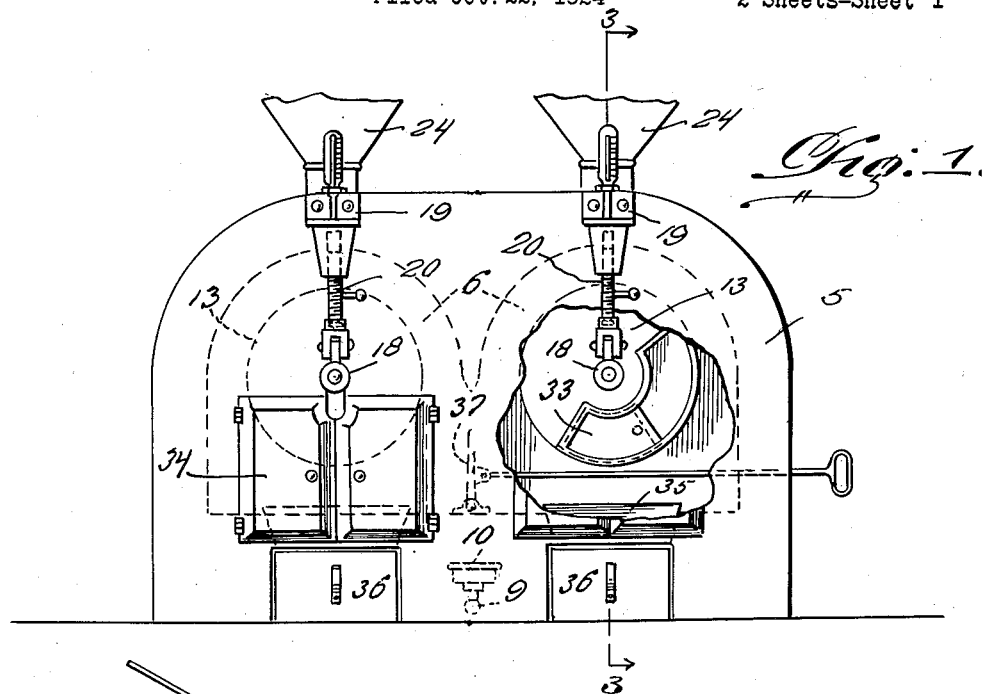
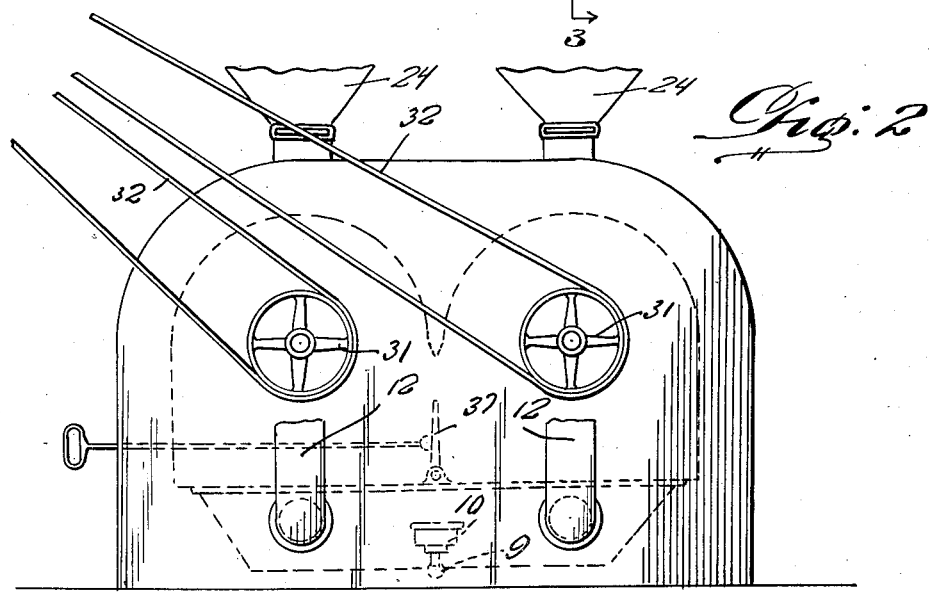
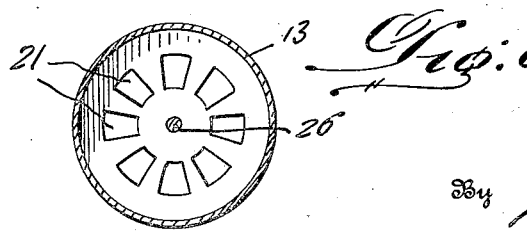
Joseph Wallos,
Inventor Nov. 22, 1927. 1,650,308
J. WALLOS
PROCESS FOR MAKING CARAMELIZED FLOUR
Filed Oct. 22, 1924 2 Sheets-Sheet 2
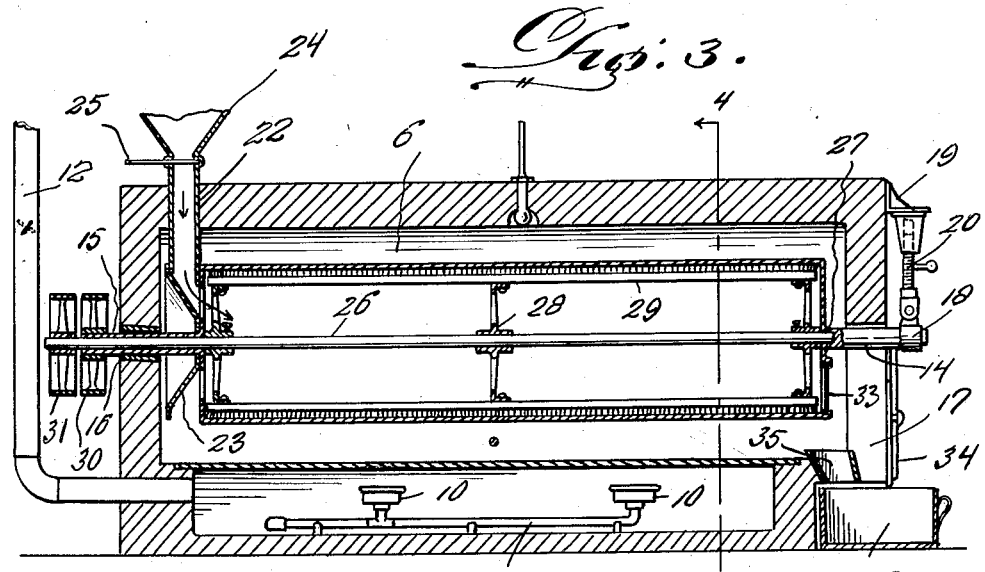
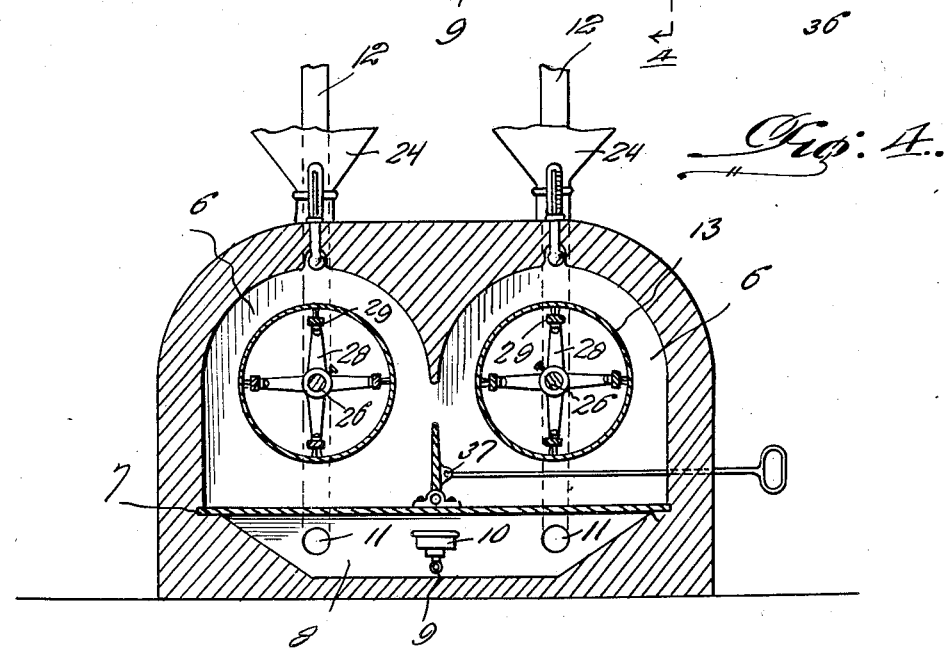
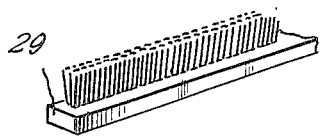
Joseph Wallos.
Inventor
By Clarence A. O'Brien
Attorney Patented Nov. 22, 1927.

1,650,308

UNITED STATES PATENT OFFICE.

JOSEPH WALLOS, OF WASHINGTON, DISTRICT OF COLUMBIA.

PROCESS FOR MAKING CARAMELIZED FLOUR.

Application filed October 22, 1924. Serial No. 745,151.

This invention relates generally to the manufacture of caramelized flour, the primary object of the invention residing in a novel method of production, whereby caramelized gluten flour may be produced from ordinary white flour, in a simple and inexpensive manner.

In previous attempts to produce a caramelized flour, the raw flour has generally been passed or disposed into an open container, to which is applied heat. In following this general method, great losses of the product occur, and it is well known that attempts along this general line have been resultant in the general obtainance of caramalized gluten flour, substantially one-tenth to one-twentieth of the raw product. In carrying out my method, substantially the entire amount of raw flour is transformed to a caramelized gluten product, the only loss being the unpalatable and fatty substances now found in raw flour, such as starch, oils, etc.

The primary object of the present method is to produce a caramelized gluten flour wherein a part of the starch is converted into dextrine and the greater part of the original moisture of the flour has been removed, and after such a removal I have ascertained the fact that the caramelized gluten flour thus produced may be maintained indefinitely, without the same becoming wormy, or otherwise unsuitable for use. In the gluten flour that is now upon the market, it is absolutely necessary that the same be used within a relatively short period from the time of manufacture.

A caramelized gluten flour produced from the present method is a highly palatable substance, and one that may be advantageously employed in the treating of obesity and the cure of dyspeptic persons.

A further and important object is to provide a substance that is highly successful in use in the making of brown gravies, cream sauces, and other foods, without incorporating in these foods any greasy or oily substances which is, at the present time, absolutely necessary in the preparation of said foods.

A still further object resides in the method of manufacturing caramelized gluten flour, wherein by subjecting the raw flour to heat, while in a sealed container, the raw product may be browned to any desirable degree for use in the preparation of different foods.

A less salient object of this invention is to provide apparatus for use in the method. However, I do not wish to be limited to the specific apparatus herein shown and described, inasmuch as in the carrying out of the method any desirable apparatus may be employed without departing from the spirit and scope of the appended claims.

In the drawings, wherein there is shown a preferable apparatus for use in the carrying out of my method, Figure 1 is an elevational view of the apparatus employed in the carrying out of the present method, the same being in the general nature of a furnace, the front wall of the furnace casing or housing being broken away for more clearly disclosing the adjacent end construction of one of the revolving drums disposed within said housing or casing.

Figure 2 is a rear end elevational view of the apparatus.

Figure 3 is a detail longitudinal sectional view, taken substantially upon the line 3—3 of Figure 1.

Figure 4 is a detail vertical sectional view, taken substantially upon the line 4—4 of Figure 3, and looking in the direction of the arrows in Figure 3.

Figure 5 is a fragmentary perspective of one of the flour agitating and scraping brush members, within the revolving drums, that constitute the essential parts of the present construction, and Figure 6 is a detail sectional view, through one of the drums, for disclosing more clearly the beating end thereof.

Now having particular reference to the drawings, the apparatus therein disclosed, which is in the general form of an oven construction includes a housing or casing 5, constructed from fire bricks, or other suitable heat resisting material, so formed as to provide a pair of longitudinally extending spaced chambers 6—6 that have communication with each other, as clearly shown in Figure 4. Built into the housing or casing 5, beneath said chambers 6—6 is a steel flooring 7, beneath which is a well 8, provided during the construction of the oven housing 5. Extending longitudinally through said well, centrally thereof, is a fuel supply pipe 9, that is equipped with a plurality of burners 10. At the rear end of said well 8, at opposite sides of the fuel supply pipe 9, are gas discharge orifices 11, within which are fitted the ends of flue pipes 12—12.

Longitudinally disposed within each chamber 6 and in spaced relation to the interior surfaces thereof is a drum or retort 13, that is formed upon its opposite end with bearing pintles 14 and 15 respectively. The rearmost pintle 15 is in the form of an elongated sleeve that is loosely journaled within a bearing 16, disposed within the end wall of the housing 5. The rearmost pintle 14 projects through a vertical slot 17, in the forward wall of said housing, and is journaled within a bearing 18 that is hung from a bracket 19 upon the forward wall of the housing and at the upper edge thereof, through the medium of an adjustable rod 20. The drums are normally disposed within the housing in a true horizontal manner. However, the bearing constructions at the forward ends of the drums allow the same to be dropped at their forward ends, whenever it is desired to discharge the material therefrom, in a manner, and for a purpose hereinafter more fully described.

The rear end wall of each drum is formed with a circular series of openings 21. Adjacent these openings is the discharge end of a material supply pipe 22, with which the openings 21 successively register, during the rotation of the drum within the housing. Attached to the sleeve pintle 15, at the rear end of the drum within the housing, is a conical shaped plate 23, that directs the material from the spout 22 through the openings 21, it being of course understood that the discharge end of said spout is of a curvature in conformity to the curvature of said conical plate. It is necessary, in the successful operation of the apparatus, that the drums be sealed and in this instance the sealing is accomplished by making the whole chambers or brick work tight.

At the upper end of the spout 22 is a suitable hopper 24, within which the raw flour is dumped. Transversely of the spout, beneath the hopper is a suitable gate valve 25, for regulating the flow of the flour from the hopper to said spout.

Extending longitudinally through each drum 13 is a rod 26, which extends through the sleeve pintle at the rear end of the drum, at its rear end, and is disposed within a socket 27 in the front end of the drum. Secured to said rod, within the drum, are spaced spiders 28, to aligned arms of which are connected relatively elongated brushes 29, the bristles of which engage the interior surface of the drums, during the rotation of the same.

Upon adjacent ends of the sleeve bearing 15 of each drum and the end of each rod 26 are pulleys 30 and 31, over which are trained belts 32, that lead to suitable power means, whereby the drums and rods are rotated. It is preferable that the drums be rotated at a slightly greater speed than the rods, in order that the scraping or wiping action of the brushes within the drums will be present, and in order that the material within the drum will be raised upwardly, which will result in the proper distribution and agitation of the flour within the drum. The action of these brushes will also remove particles of the flour from the interior surface of the drum and thereby prevent burning of the same. An additional object of the brush construction is to spread the flour throughout the length of the drum, in order that the entire mass will be subjected to a uniform heat treatment.

The front end wall of each drum 13 is provided with a sliding airtight door 33, whereby after the drums have been filled, the flour may be discharged therefrom, by dropping these ends thereof. Access may be had to the drums through openings in the front wall of the housing, but are normally closed through the medium of swinging doors 34. Beneath the forward ends of the drums are spouts 35, that convey the gluten flour to containers 36.

In the use of the apparatus, either one or both of the drums may be employed. In the event that only one of the drums is used, it is desirable that a minimum amount of heat be applied to the unused drum, and for accomplishing this result, there may be, and preferably is provided, a suitable form of damper, shown generally in the drawing, and designated 37. This damper is to be obviously actuated exteriorly of the housing.

In carrying out my method for producing gluten flour, through the use of apparatus of the general type, as shown in the drawing, the raw sifted flour is first disposed within the hopper 24. Previous to the placing of the flour within the hopper, the burners 10 are lighted, and the drums slowly rotated. After the drums have become sufficiently heated, the flour is allowed to pass downwardly through the spout 22, into said drum, and during the rotation thereof, together with the rotation of the brush members 29, the flour will be thoroughly agitated, and spread throughout the entire length of the drum. The heating of the flour within these air tight drums will relieve the same of more than half of its original moisture and oily substances, and impart to the flour a brownish color of any desirable degree, depending upon the length of time that the same is left within the drum. Ordinarily the flour is kept within the drum for a period of approximately thirty minutes to produce a light brownish color, and if a darker color is desired it may be kept thirty minutes longer.

After the flour has been heated to the desired degree, usually 150° F., the burners are turned off, and the rotation of the drums stopped. Through the connecting means 20, the rear ends of the drums are dropped, after which the slide doors 33 are opened, at which time the flour will pass downwardly through said openings, and into the receptacles 36.

I have found, by actual experiments, that the method herein described will produce a highly satisfactory caramelized gluten flour, and one that has insufficient moisture to encourage germ propagation while part of the starch has been changed to dextrin some of the natural oils evaporated. In addition to this, I have also discovered that practically the entire mass of raw flour will be converted into caramelized gluten flour, and that the loss of the product will be very small.

I do not wish to be limited to the specific apparatus shown, nor to the specific steps of the method, insomuch as in the future practice of the invention, departures may be made, without affecting the spirit and scope of the appended claims.

Having thus described my invention, what I claim as new, and desire to secure by Letters Patent is:

1. A process for making caramelized flour which consists in placing white flour in a rotating retort which is substantially closed to the outer atmosphere, heating said retort indirectly at a uniform temperature throughout, and simultaneously subjecting the white flour while being heated to agitation in addition to the agitation it receives from the rotating retort.

2. A process for making caramelized flour which consists in placing white flour in a retort which is substantially closed to the atmosphere, heating said retort at a uniform temperature throughout, rotating said heated retort to distribute the white flour uniformly over the surface thereof, and agitating the flour during the heating separately from the agitation it receives from the rotating retort.

3. The process of preparing caramelized flour which consists in placing it over a heated moving surface and simultaneously agitating the mass of flour on the heated moving surface, said flour during the heating and agitating period being maintained in a confined space substantially closed to the atmosphere, and continuing the heating and agitation until part of the starch of the flour has been converted into dextrine and less than fifty per cent of the original moisture of the flour remains.

In testimony whereof I affix my signature.

JOSEPH WALLOS.